United States Patent
Cresswell et al.

(10) Patent No.: US 11,542,972 B2
(45) Date of Patent: Jan. 3, 2023

(54) FASTENING ASSEMBLY INCLUDING A NUT HOLDER AND A FASTENING PLATE FASTENED TO A SUBSTRATE

(71) Applicant: Airbus Operations SAS, Toulouse (FR)

(72) Inventors: Philip Cresswell, Toulouse (FR); Julien Salomon, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 324 days.

(21) Appl. No.: 16/869,088

(22) Filed: May 7, 2020

(65) Prior Publication Data
US 2020/0355208 A1 Nov. 12, 2020

(30) Foreign Application Priority Data
May 10, 2019 (FR) ...................................... 1904854

(51) Int. Cl.
*F16B 5/06* (2006.01)
*B64C 7/00* (2006.01)

(52) U.S. Cl.
CPC . *F16B 5/06* (2013.01); *B64C 7/00* (2013.01)

(58) Field of Classification Search
CPC .. F16B 5/06; F16B 5/02; F16B 37/043; F16B 37/048; F16B 11/006
See application file for complete search history.

(56) References Cited

U.S. PATENT DOCUMENTS

| | | | | |
|---|---|---|---|---|
| 4,768,907 A | * | 9/1988 | Gauron | F16B 37/044 411/85 |
| 4,895,484 A | * | 1/1990 | Wilcox | F16B 37/044 411/85 |
| 2004/0013492 A1 | * | 1/2004 | Clinch | F16B 37/068 411/112 |
| 2004/0165965 A1 | * | 8/2004 | Unverzagt | F16B 37/0807 411/84 |

(Continued)

FOREIGN PATENT DOCUMENTS

| | | |
|---|---|---|
| EP | 2890905 B1 | 5/2017 |
| EP | 2885548 B1 | 9/2017 |
| WO | 03036106 A1 | 5/2003 |

OTHER PUBLICATIONS

French Search Report; priority document.

*Primary Examiner* — Robert Sandy
*Assistant Examiner* — Rowland Do
(74) *Attorney, Agent, or Firm* — Greer, Burns & Crain, Ltd.

(57) ABSTRACT

A fastening assembly suitable for being fastened to a substrate with a front face and a first hole. The fastening assembly includes a fastening plate with a second plate with front and rear faces and pierced with a second hole aligned with the first hole. The fastening plate front face is fastened to the substrate rear face. The assembly includes a nut holder with a third plate with front and rear faces and pierced with a third hole aligned with the second hole and a nut fastened to the third plate on the side of the rear face and coaxial with (Continued)

the third hole. The front face of the nut holder is fastened to the rear face of the fastening plate. The fastening plate includes a first fastener that engages with a second fastener of the nut holder to removably fasten the nut holder to the fastening plate.

7 Claims, 3 Drawing Sheets

(56) References Cited

U.S. PATENT DOCUMENTS

| | | |
|---|---|---|
| 2005/0012002 A1 | 1/2005 | Ortwein |
| 2009/0103997 A1 | 4/2009 | Csik et al. |
| 2009/0129885 A1* | 5/2009 | Csik .................... F16B 37/046 248/220.21 |
| 2014/0064873 A1 | 3/2014 | Kevin et al. |

* cited by examiner

FASTENING ASSEMBLY INCLUDING A NUT HOLDER AND A FASTENING PLATE FASTENED TO A SUBSTRATE

CROSS-REFERENCES TO RELATED APPLICATIONS

This application claims the benefit of the French patent application No. 1904854 filed on May 10, 2019, the entire disclosures of which are incorporated herein by way of reference.

FIELD OF THE INVENTION

The present invention relates to a fastening assembly suitable for being fastened to a substrate and including a nut holder and a fastening plate fastened to the substrate to fasten the nut holder to the substrate, together with a structure including such a fastening assembly.

BACKGROUND OF THE INVENTION

An aircraft conventionally includes numerous nut holders. Such a nut holder conventionally includes a plate and a nut that is fastened to the plate. The plate is fastened to the substrate so that the hole in the nut is positioned facing a hole in the substrate. A screw can then be screwed into the nut through the substrate without it being necessary to hold it.

The plate is generally fastened to the substrate through the installation of two rivets. To this end, the plate and the substrate then include a hole for each rivet.

Although such an installation gives good results, holes must be made in the plate and the substrate for installing the rivets for holding the nut holder, which results in additional work that can be laborious in tight spaces, and the wear of cutting tools.

In addition, in the event of use with a substrate of a certain thickness (>5 mm), there are no rivets long enough to fasten the nut holder directly to the substrate. In this case, the nut holder is generally riveted to a thin intermediate plate, which is then fastened to the substrate using fastenings with a larger diameter that are compatible with the thickness of the substrate.

It is therefore necessary to find a specific arrangement that is simpler to implement.

SUMMARY OF THE INVENTION

One object of the present invention is to propose a fastening assembly suitable for being fastened to a substrate and including a nut holder and a fastening plate fastened to the substrate to fasten the nut holder to the substrate.

To this end, a fastening assembly is proposed that includes:
- a fastening plate including a second plate with a front face and a rear face and pierced with a second hole suitable for being aligned with a first hole in a substrate including a rear face, in which the front face of the fastening plate is suitable for being fastened to the rear face of the substrate, and
- a nut holder including a third plate with a front face and a rear face and pierced with a third hole aligned with the second hole and a nut fastened to the third plate on the side of the rear face and coaxial with the third hole, in which the front face of the nut holder is fastened to the rear face of the fastening plate,
- in which the fastening plate includes first fastening means that engage with second fastening means of the nut holder in order to removably fasten the nut holder to the fastening plate,
- wherein the first fastening means take the form of two spurs that pass through the third plate and are wedged behind the rear face of the nut holder and wherein the second fastening means take the form of windows that pass through the third plate to enable the passage of the two spurs.

Such a fastening assembly thus enables fastening without rivets that permits the replacement of the nut holder if necessary.

Advantageously, on the side of its front face, the second plate has a recess that is suitable for being open towards the rear face of the substrate and for being filled with glue.

Advantageously, the recess includes an opening that communicates with the outside.

Advantageously, the fastening plate includes a neck fastened on the front face and protruding relative to the front face, and the neck is suitable for being inserted into the first hole.

Advantageously, the neck is fastened to the fastening plate by tabs.

The invention also proposes a structure including:
a substrate including a rear face and a first hole, and
an assembly according to the previous variant,
in which the second hole is aligned with the first hole, and
in which the front face of the fastening plate is fastened to the rear face of the substrate.

Advantageously, on the side of its front face, the second plate has a recess that is open towards the rear face of the substrate and is filled with glue.

Advantageously, the recess includes an opening that communicates with the outside.

Advantageously, the fastening plate includes a neck fastened on the front face and protruding relative to the front face, and the neck is inserted into the first hole.

Advantageously, the neck is fastened to the fastening plate by tabs.

BRIEF DESCRIPTION OF THE DRAWINGS

The aforementioned features of the invention, along with others, will become more apparent on reading the following description of an embodiment, said description being given with reference to the attached drawings, in which.

DETAILED DESCRIPTION OF THE PREFERRED EMBODIMENTS

Figure 1:
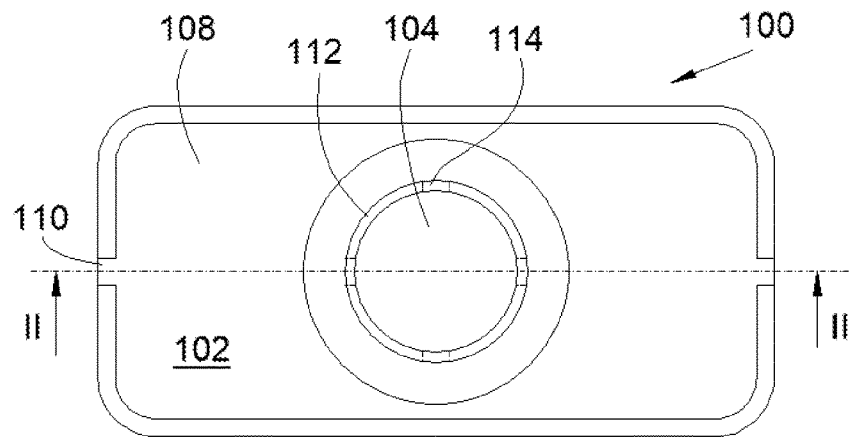
FIG. 1 is a top view of a fastening plate of a fastening assembly according to the invention.
Figure 2:
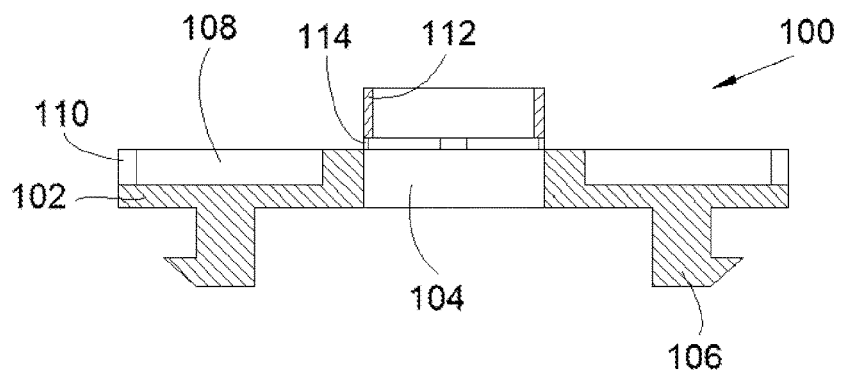
FIG. 2 is a cross-sectional side view along the line II-II of the fastening plate in FIG. 1.
Figure 3:
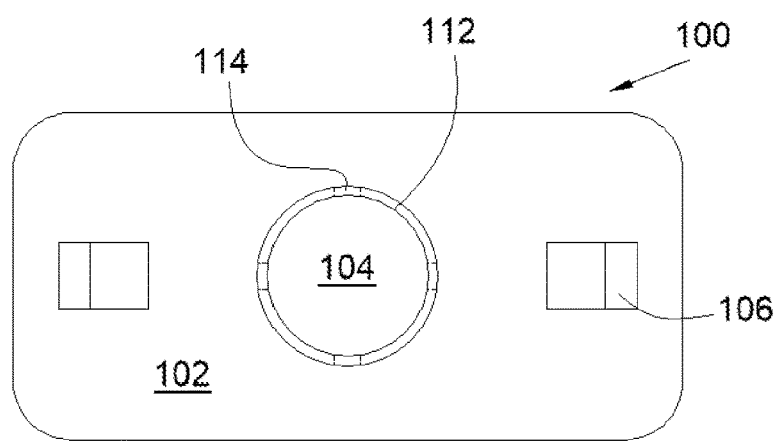
FIG. 3 is a bottom view of the fastening plate in FIG. 1.

FIGS. 1 to 3 show a fastening plate 100 according to the invention.

Figure 4:
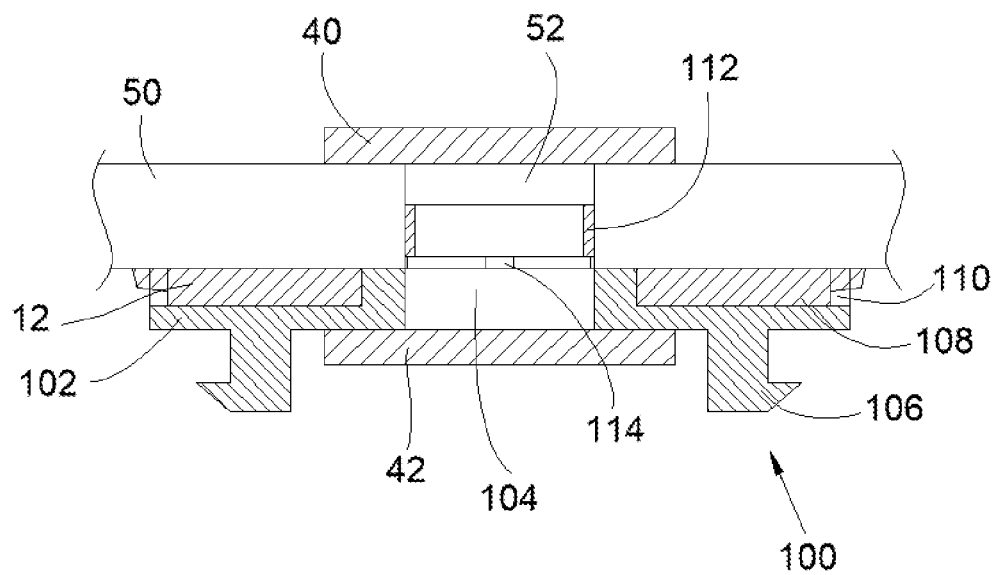
FIG. 4 is a cross-sectional view similar to that in FIG. 2, for a step of an assembly method according to the invention.
Figure 5:
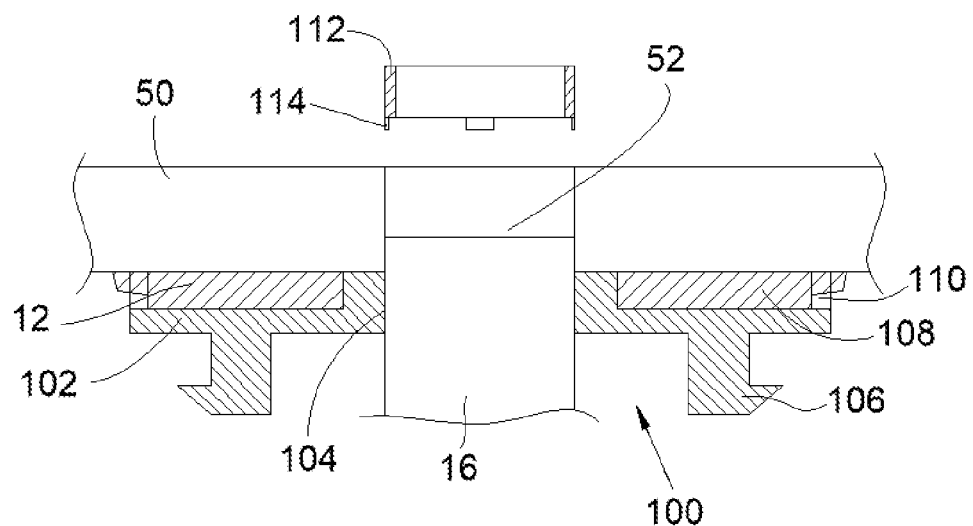
FIG. 5 is a cross-sectional view similar to that in FIG. 4, for another step of the assembly method.

FIGS. 4 and 5 show the fastening plate 100 fastened to a substrate 50.

Figure 6:
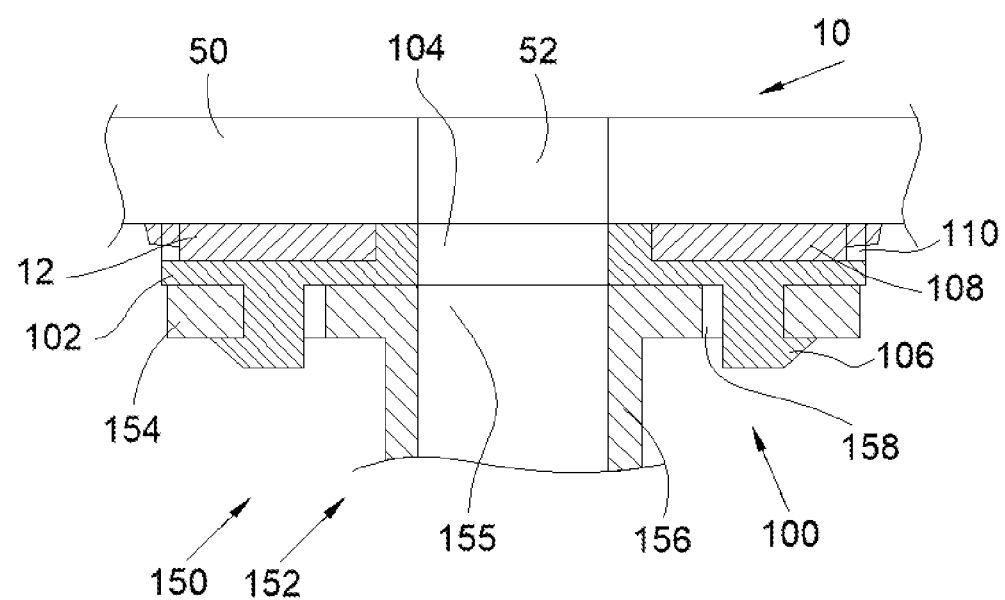
FIG. 6 is a cross-sectional view similar to that in FIG. 4, for another step of the assembly method.

FIG. 6 shows a structure 10 including the substrate 50 and a fastening assembly 150 that in turn includes the fastening plate 100 fastened to the substrate 50 and a nut holder 152 removably fastened to the fastening plate 100.

Here, the substrate 50 takes the form of a first plate with a rear face and a first hole 52.

The fastening plate 100 includes a second plate 102 with a front face and a rear face and a second hole 104 that passes through the second plate 102 and is aligned with the first hole 52.

The nut holder 152 includes a third plate 154 that has a front face and a rear face and is pierced with a third hole 155 aligned with the second hole 104 and a nut 156 fastened to the third plate 154 on the side of the rear face and coaxial with the third hole 155.

The different holes are thus aligned so that they enable the installation of a screw that is screwed into the nut 156 through the first hole 52, the second hole 104, and the third hole 155.

In the structure 10, the front face of the fastening plate 100 is fastened to the rear face of the substrate 50 and the front face of the nut holder 152 is fastened to the rear face of the fastening plate 100.

In the embodiment of the invention shown here, the fastening plate 100 is fastened to the substrate 50 permanently by gluing. To this end, on the side of its front face, the second plate 102 has a recess 108 that is open towards the rear face of the substrate 50 and enables the application of glue 12, which after drying and polymerization, fastens the fastening plate 100 to the rear face of the substrate 50.

The fastening plate 100 also includes first fastening means 106 that engage with second fastening means 158 of the nut holder 152 in order to removably fasten the nut holder 152 to the fastening plate 100. In other words, the nut holder 152 can be fastened and detached from the fastening plate 100 without damage to the nut holder 152 or the fastening plate 100.

In the embodiment of the invention shown here, the first fastening means 106 take the form of two spurs that pass through the third plate 154 and are wedged behind the rear face of the nut holder 152. The second fastening means 158 take the form of windows that pass through the third plate 154 to enable the passage of the two spurs 106.

A method for assembling the structure 10 comprises:
  a fastening step during which the front face of the fastening plate 100 is fastened to the rear face of the substrate 50, and
  an installation step during which the nut holder 152 is removably fastened to the rear face of the fastening plate 100 using the fastening means 106 and 108.

In the embodiment of the invention shown here, the fastening step comprises:
  a preparation for gluing step during which the recess 108 is filled with glue 12,
  a gluing step during which the front face of the fastening plate 100 thus prepared is pressed against the rear face of the substrate 50, and
  a pressure maintenance step during which the fastening plate 100 is pressed against the rear face of the substrate 50 until the glue 12 cures.

FIG. 4 shows the pressure maintenance step, which is performed here by clamping means 40 and 42 that clamp the fastening plate 100 and the substrate 50 against each other.

FIG. 6 shows the installation step.

Such a structure 10 does not therefore require any additional holes either in the nut holder 152 or in the substrate 50 and it makes it possible to replace the nut holder 152 if necessary, without changing the fastening plate 100.

In order to enable the discharge of excess glue 12 and the evacuation of the air trapped between the second plate 102 and the substrate 50, the recess 108 includes an opening 110 that communicates with the outside of the recess 108 when the second plate 102 is pressed against the substrate 50.

Optionally, in order to facilitate that alignment of the second hole 104 with the first hole 52, the fastening plate 100 includes a neck 112 fastened on the front face and protruding relative to the front face. The outer diameter of the neck 112 is fitted to the diameter of the first hole 52, that is, the neck 112 can freely enter the first hole 52 without excessive clearance, while ensuring that the holes in the substrate 50, the fastening plate 100 and the nut holder 152 remain coaxial.

Thus, during the fastening step, the neck 112 is inserted into the first hole 52 and between the fastening step and the installation step, the assembly method includes a removal step during which the neck 112 is removed.

FIG. 5 shows the removal step.

In the embodiment of the invention shown here, the removal step comprises inserting a tool 16, for example a drill bit, into the second hole 104 in order to remove the neck 112. Here, the neck 112 is fastened to the fastening plate 100 by tabs 114 that are easy to break using the tool 16.

The fastening plate 100 is preferably produced by molding a thermoplastic material.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening assembly comprising:
  a fastening plate including a second plate with a front face and a rear face and pierced with a second hole configured to be aligned with a first hole in a substrate including a rear face, in which the front face of the fastening plate is configured to be fastened to the rear face of the substrate, and
  a nut holder including a third plate with a front face and a rear face and pierced with a third hole aligned with the second hole and a nut fastened to the third plate on the side of the rear face and coaxial with the third hole, in which the front face of the nut holder is fastened to the rear face of the fastening plate,
  wherein the fastening plate includes first fastening means that engage with second fastening means of the nut holder to removably fasten the nut holder to the fastening plate,
  wherein the first fastening means are formed as two spurs that pass through the third plate and are wedged behind a rear face of the nut holder and wherein the second fastening means are formed as windows that pass through the third plate to enable passage of the two spurs, wherein the fastening plate includes a neck fastened on the front face and protruding relative to the front face, and wherein the neck is configured to be inserted into the first hole.

2. The fastening assembly according to claim 1, wherein on the side of the front face, the second plate has a recess that is configured to be open towards the rear face of the substrate and for being filled with glue.

3. The fastening assembly according to claim 2, wherein the recess includes an opening that communicates with the outside.

4. The fastening assembly according to claim 1, wherein the neck is fastened to the fastening plate by tabs.

5. A structure including:
a substrate including a rear face and a first hole, and
a fastening assembly according to claim 1,
wherein the second hole is aligned with the first hole, and
wherein the front face of the fastening plate is fastened to the rear face of the substrate.

6. The structure according to claim 5, wherein on the side of the front face, the second plate has a recess that is open towards the rear face of the substrate and is filled with glue.

7. The structure according to claim 6, wherein the recess includes an opening that communicates with the outside.

* * * * *